J. H. VIVIAN.
ROCK DRILL CRADLE.
APPLICATION FILED SEPT. 24, 1913.

1,179,782.

Patented Apr. 18, 1916.

Attest:
R. Richardson.
May Frevert.

Inventor:
James Howard Vivian
by Wm. B. Whitney Atty

UNITED STATES PATENT OFFICE.

JAMES HOWARD VIVIAN, OF JOHANNESBURG, TRANSVAAL, SOUTH AFRICA, ASSIGNOR TO HOLMAN BROTHERS, LIMITED, OF CAMBORNE, ENGLAND, A CORPORATION.

ROCK-DRILL CRADLE.

1,179,782.

Specification of Letters Patent.

Patented Apr. 18, 1916.

Application filed September 24, 1913. Serial No. 791,482.

*To all whom it may concern:*

Be it known that I, JAMES HOWARD VIVIAN, a subject of the King of Great Britain, residing at Johannesburg, Colony of Transvaal, South Africa, have invented certain new and useful Improvements in Rock-Drill Cradles, of which the following is a specification.

My present invention relates to the cradle of rock drills, and has for its object to improve the construction and thereby increase the efficiency and durability both of the cradle itself and of the rock drill as a whole.

To this end the invention comprises certain novel features of construction, arrangement, and combination of parts as hereinafter described and more particularly pointed out in the claims.

As illustrated in the accompanying drawing, in which—

Figure 1:
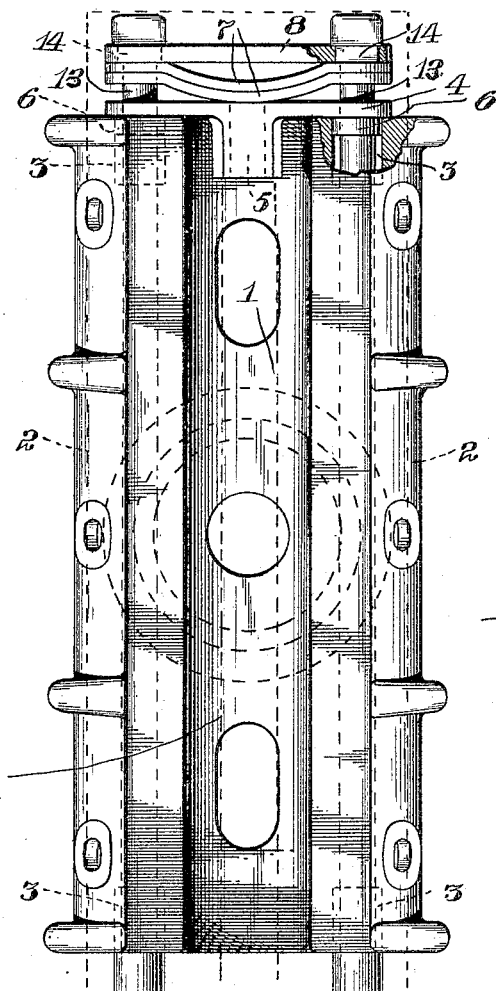
Figure 2:
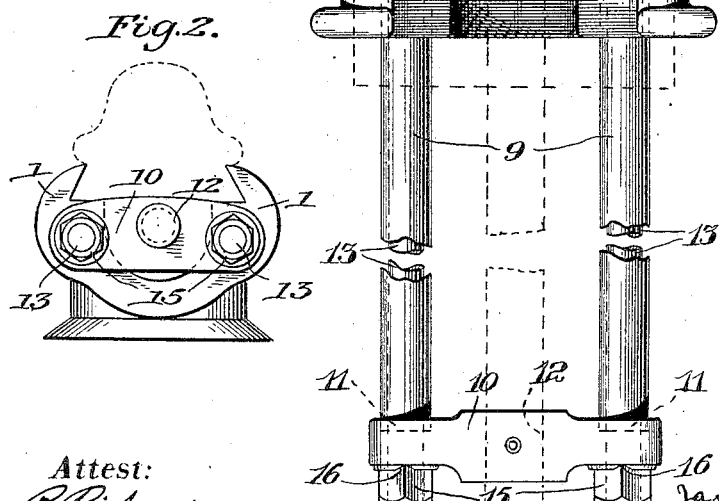

Figure 1 is a plan view, with parts broken away, of the upper or inner side of the cradle of a rock drill embodying the several features of my invention, and Fig. 2 is a front end view of the same—

1 is the shell or body of the cradle of the type known as the Holman "take-up-wear" cradle. This cradle, according to my invention, is traversed longitudinally by two bolt holes 2 2, one on each side, which are enlarged for a short distance at each end to form pillar holes or sockets 3 3. A guide-piece 4, having a cylindrical bearing 5 for the front end of the feed-screw (shown in dotted lines), is provided with two tubular bosses 6 6 which fit within the sockets in one end, becoming thereby the front end, of the cradle and so hold the guide-piece in position thereon. The buffer springs 7 bear against the outer face of the guide-piece, and a gland 8 bears against the outer buffer spring. Two tubular pillars 9 9 fit at one of their ends within the sockets in the rear end of the shell and at their other ends within sockets 11 11 formed in the inner side of the cross-head 10, which latter is provided with the usual cylindrical bearing 12 for the rear end of the feed-screw. The several parts are held together by a pair of through bolts 13 13, which are provided with square necks 14 14 fitting into corresponding square holes in the gland at the front end of the cradle and extend through holes in the ends of the buffer springs, the tubular bosses of the guide-pieces, the bolt holes of the cradle, and holes in the ends of the cross-head. The nuts 15 15 upon the threaded ends of the bolts are locked in place by means of transverse projections 16 16 on their inner faces, which projections fit into the correspondingly shaped recesses formed in the outer face of the cross-head.

By the construction described I provide a cradle the parts of which can readily be assembled and in which any part when broken or worn out can be quickly and easily replaced. The buffer springs interposed between the guide-piece and the gland serve to relieve the shock not only upon these two parts but also upon the feed-screw, cross-head, pillars, bolts, and nuts. The nuts of the bolts are self-locking upon the cross-head and so do not become loosened by the constant jarring of the drill. And, what is perhaps most important, the guide-piece and pillars, fitting as they do the sockets in both ends of the shell, can be interchanged as often as desired, thereby reversing the front and rear ends of the cradle and the wear thereon which is usually greatest at the front end.

While I have shown and described my invention in what I now consider to be the best form for its embodiment, it will be understood that the construction may be modified in its various details, within the scope of the appended claims, without departing from the spirit or sacrificing the advantages thereof.

What I claim as new, and desire to secure by Letters Patent, is—

1. A cradle for rock drills which comprises a shell, a guide-piece for a feed screw, a cross-head, and means for securing the guide-piece and the cross-head interchangeably in place at the opposite ends of the shell.

2. A cradle for rock drills which comprises a shell, and a guide-piece for a feed screw mounted at one end and a cross-head mounted at the other end of the shell, said guide-piece and cross-head being secured together with an intervening buffer-spring adapted to take up the thrust between them.

3. In a cradle for rock drills, the combination of a shell, pillars which are mounted on one end of the shell, and a cross-head which is mounted upon the outer end of the pillars and is yieldingly held in position in alinement with the shell, 4. In a cradle for rock drills, the combination of a shell, pillars mounted at one of their ends upon one end of the shell, a cross-head mounted upon the outer ends of the pillars, and as means for securing the cross-head in position relative to the shell bolts which extend through the several parts and are provided with nuts adapted to lock and normally held locked against the outer face of the cross-head by springs interposed between the heads of the bolts and the other end of the shell.

5. In a cradle for rock drills, the combination of a shell having longitudinal bolt holes enlarged at each end to form sockets, a guide-piece provided with tubular bosses fitting within the sockets at one end of the shell, a buffer-spring bearing against the outer face of the guide-piece, tubular pillars set into the sockets in the opposite end of the shell, a cross-head provided with sockets into which set the outer ends of the tubular pillars, and bolts passing through and holding together the said parts.

6. In a cradle for rock drills, the combination of a shell, a guide-piece adapted to be mounted on either end of the shell, a cross-head adapted to be mounted by means of intervening pillars on the other end of the shell, and means for yieldingly securing the guide-piece and the cross-head together the former upon one end and the latter upon the other end of the shell.

JAMES HOWARD VIVIAN.

In presence of—
 ALFRED L. SPOOR,
 J. WARREN VENNING.

Copies of this patent may be obtained for five cents each, by addressing the "Commissioner of Patents, Washington, D. C."